Sept. 17, 1968 M. GREENBERG 3,402,309

BIDIRECTIONAL LIMITED MOTION MECHANISM

Filed June 20, 1966 2 Sheets-Sheet 1

INVENTOR
MALVIN GREENBERG

BY Walter J. Kreske
ATTORNEY

BIDIRECTIONAL LIMITED MOTION MECHANISM

Filed June 20, 1966 2 Sheets-Sheet 2

INVENTOR
MALVIN GREENBERG
BY Walter J. Kreske
ATTORNEY 3,402,309

BIDIRECTIONAL LIMITED MOTION MECHANISM

Malvin Greenberg, Commack, N.Y., assignor to General Electronic Laboratories, Inc., Boston, Mass., a corporation of Delaware Filed June 20, 1966, Ser. No. 558,975
7 Claims. (Cl. 310—80)

This invention relates to mechanisms for rapid bidirectional limited motion with capacity for automatically returning to a stable starting position and more particularly to an improved mechanism having capacity for rapidly effecting movement a preselected distance in one and the opposite directions from a base or home position and thereafter in each instance automatically returning to said home or base position.

In such equipment as switches, chart recorders and teaching devices it often becomes desirable to effect component motion a limited distance in a selected direction, for example, the movement of a switch lever to effect selection of several possible positions, or the momentary movement of a pen in one or the other directions over a recording medium to record a desired information bit. A use for which the present invention is particularly suited is that of a recording pen moving mechanism in a teaching aid machine of which I am a co-inventor and which is described in application for patent Ser. No. 448,917, filed in the United States Patent Office on Apr. 19, 1965, and entitled, Responding Apparatus. For convenience of illustration the present invention is hereinafter described in connection with the above-mentioned responding apparatus with the understanding that its use is not limited thereto.

A primary object of the present invention is the provision of an improved mechanism for effecting limited motion selectably in one and the opposite directions from a stable neutral or home position with capacity for automatically returning to said stable neutral or home position on completion of said motion.

Another object is the provision of an improved mechanism for providing a limited translatory motion along a single path selectably in one and the opposite directions from a base or home position with capacity for thereafter automatically returning to said base or home position.

A further object is the provision of a relatively simple, reliable and rugged mechanism for rapidly effecting limited motion selectably in one and the opposite directions from a stable home position and thereafter automatically returning to said stable home position.

And a still further object is the provision of a bidirectional motion producing mechanism particularly suitable for effecting the marking function in the abovementioned responding apparatus.

These objects, features and advantages are achieved generally by providing a spindle having a longitudinal axis with the spindle being mounted on a base for rotation about the axis, a rotary solenoid fixed to one side of the spindle for imparting rotation about the axis in one direction, another rotary solenoid fixed to the other side of the spindle for imparting rotation about the axis in the opposite direction, a spring pressed plunger extending from the spindle in substantially perpendicular relation to the axis, a triangular shaped formation having a vertex and two sides extending from the vertex arranged to engage the spring pressed plunger in manner tending to ride said sides toward the vertex and to come to rest at the vertex, and a lever extending from the spindle in perpendicular relation to the axis and adapted for imparting motion to a use device.

By making the lever with a forked or bifurcated end configuration straddling a cross pin in a piston type sliding member, translatory motion of the piston is thereby effected for providing translatory motion to use devices such as pens attached to the piston.

By providing a base having attached thereto a center bracket on each side of the spindle and arranged for rotatively carrying the spindle, and a solenoid bracket for each of the rotary solenoids arranged for carrying the solenoids in place on the base, a compact, rugged and relatively inexpensive mechanism is thereby achieved.

These and other features, objects and advantages will be better understood from the following description taken in connection with the accompanying drawings of a preferred embodiment of the invention and wherein.

Figure 1:
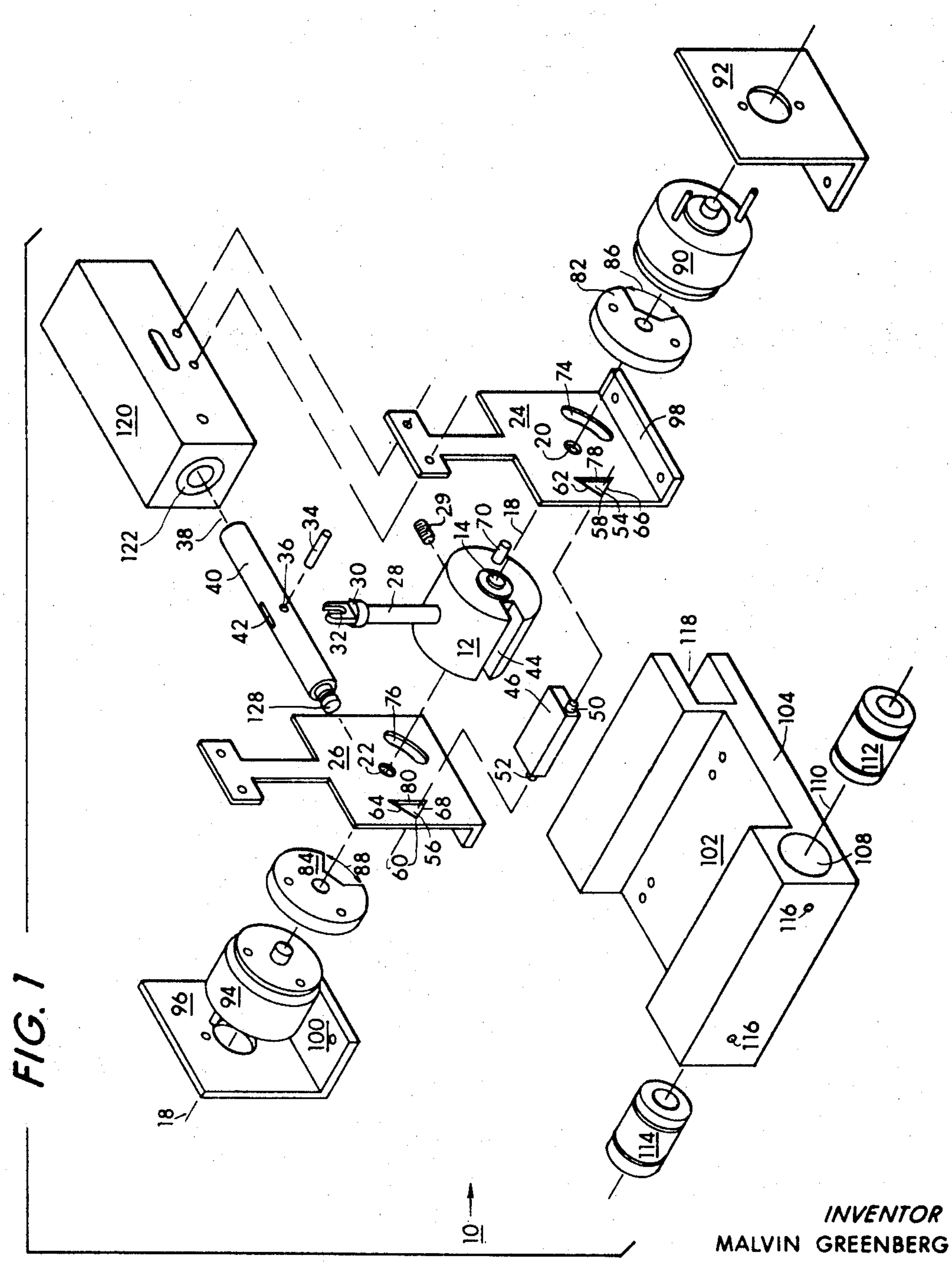
FIG. 1 is an isometric showing of the components making up the preferred embodiment of the invention in disassembled form and in proper assembling relation to each other.

Referring to the drawings in more detail, a bidirectional motion producing mechanism in accordance with the present invention is designated generally by the numeral 10. The mechanism 10 has a spindle 12 having pivots 14 and 16 extending outwardly from each of the sides of the spindle 12 along longitudinal spindle axis 18 for pivotally mounting the spindle 12 in pivot holes 20 and 22 of brackets 24 and 26 respectively.

The spindle 12 also has a lever 28 held in place by a set screw 29 and extending upwardly in substantially perpendicular relation to the longitudinal axis 18 and terminating at its upper extremity in a forked or bifurcated head 30 having a slot 32 for receiving a limit pin 34 carried in a hole 36 running perpendicular to the axis 38 of a piston or plunger 40 and substantially centrally of a slot 42 for loosely receiving the slotted portion of the bifurcated head 30.

The spindle 12 also has an elongated slot 44 substantially parallel to longitudinal axis 18 extending radially from the periphery toward the axis 18 and dimensioned to slidably receive a rectangular plunger or pressure pad 46 yieldably with continuous outward radial pressure exerted thereon by springs 48 in additional recesses in the spindle 12. Thus, pressure pins 50 and 52 which extend laterally from the respective sides of the plunger 46 into triangular-shaped openings 54 and 56 of the center brackets 24 and 26, respectively, continuously seek and come to rest in the vertices 58 and 60 to effect a stable and normal position for the spindle 12. As a result, if the spindle 12 is rotated clockwise within the limits permitted by the openings 54 and 56, the upper legs 62 and 64 provide an effective inclined plane over which pressure pins 50 and 52, respectively, travel in conjunction with the springs 48 and thereby force the spindle to rotate in a counterclockwise direction until the pressure pins 50 and 52 come to rest in the vertices 58 and 60, respectively.

Vice versa, when the spindle 12 is rotated counterclockwise within the limits permitted by the triangular openings 54 and 56, the triangular legs 66 and 68 respectively engage the pressure pins 50 and 52 which together with the springs 48 tend to yieldably force the spindle 12 to pivot in the opposite direction until the pressure pins 50 and 52 again come to rest in the vertices 58 and 60, respectively.

Thus, it is seen that the spindle 12 is capable of a bidirectional limited movement, after which in each instance it is automatically returned and remains in this stable vertex position.

Striker pins 70 and 72 (FIGS. 1 and 3) also extend outwardly from opposite sides of the spindle 12 and substantially parallel to the longitudinal axis 18, through arcuate openings 74 and 76 in the center brackets 24 and 26 respectively. The back legs 78 and 80 of the triangular openings 54 and 56 respectively function to stop the pressure pins 50 and 52, respectively, thereby accurately limiting the degree of spindle 12 rotation. Release of the spindle 12 from such rotated position will permit the spindle 12 to seek its normal position defined by the pressure pins 50 and 52 coming to rest at the vertices 58 and 60, respectively.

Striker pins 70 and 72 extend through arcuate openings 74 and 76 into the striker recess 86 of a right striker plate 82 and recess 88 of a left striker plate 84, respectively. The right striker plate 82 is fixed to a rotary solenoid 90 held in place by a solenoid bracket 92 for clockwise rotation about the longitudinal axis 18. The left striker plate 84 is fixed to a rotary solenoid 94 held in place on a left solenoid bracket 96 for counterclockwise rotation about the longitudinal axis 18. A number 3B Ledex rotary solenoid has been found suitable for each of the rotary solenoids 90 and 94, but any suitable rotary solenoid may also be used.

The angles 86 and 88 of the recesses in the respective striker plates 82 and 84 are sufficiently large to permit free movement of the associated striker pin when the opposite solenoid is actuated. For example, when rotary solenoid 90 is actuated in a clockwise direction, striker plate 82 contacts striker pin 70 and thereby rotates the pinion 12 clockwise within the limits permitted by the triangular openings 54 and 56, the angle 88 in the left striker plate 84 provides sufficient clearance to permit this movement without obstructing the other striker pin 72. Likewise, when the counterclockwise rotation of striker plate 84 due to the left rotary solenoid being energized engages the striker pin 72 so as to rotate the spindle 12 in a counterclockwise direction within the limits permitted by the triangular openings 54 and 56, the angle 86 in the right striker plate is large enough to permit this counterclockwise movement without obstructing the striker pin 70.

The center brackets 24 and 26 have flanges 98 and 100 which rest in a channel 102 of a base 104 and are fastened in place as by screws 106. Solenoid brackets 92 and 96 have flanges 108 and 110 respectively fastened in the channel 102 by screws 106.

The base 104 has a hole 108 having a longitudinal axis 110 substantially parallel to the longitudinal axis 18 and carries at each end therein a linear bushing 112 and 114 respectively, held in place by set screws 116, for slidably mounting the base 104 on the main shaft 173 shown in FIG. 1 of the above-mentioned responding apparatus application. The other side of the base 104 has a slot 118 parallel to the axis 110 for slidably mounting on a track such as another guide rod 176 shown in FIG. 1 of the above mentioned application which in the present instance would preferably be placed on the same level with the rod 173 for carrying the base 104.

Center brackets 124 and 126 at their upper ends carry a hollow bushing block 120 in the hollow of which is a bushing 122 slidably mounting the piston or plunger 40. The bushing block 120 has a clearance slot 124 for the lever 28 and head 30. In the present instance of the adaptation of the present invention for use with the above mentioned responding apparatus, a pen holder 126 is fastened to the end adapter 128 of the plunger 40 and held in place by a thumb screw 130. The pen adapter 126 has therein a pen 132 engaging the paper record 161 shown in FIG. 1 of the above mentioned application, which is carried on the cover plate 160 of that device.

Figure 3:
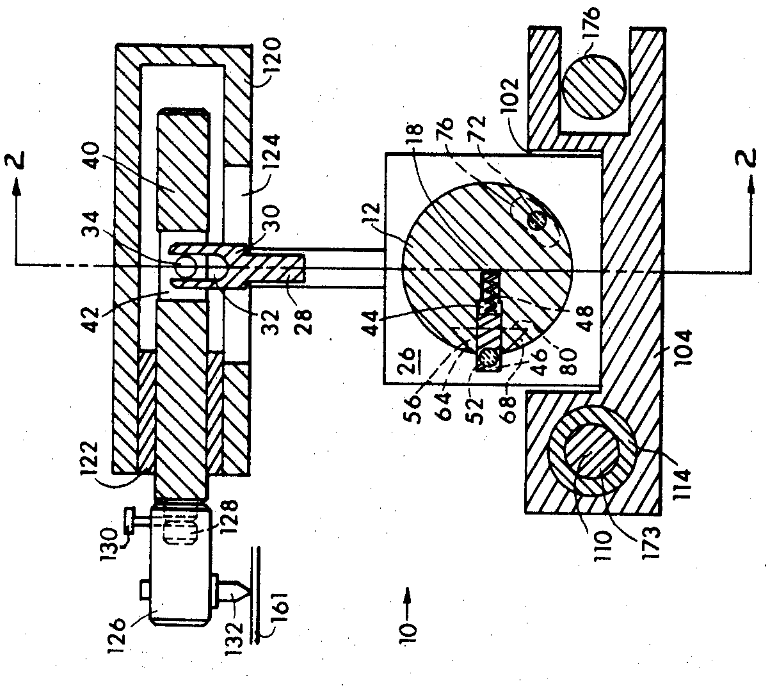
FIG. 3 is a cross sectional view taken on line 3—3 of FIG. 2.
Figure 2:
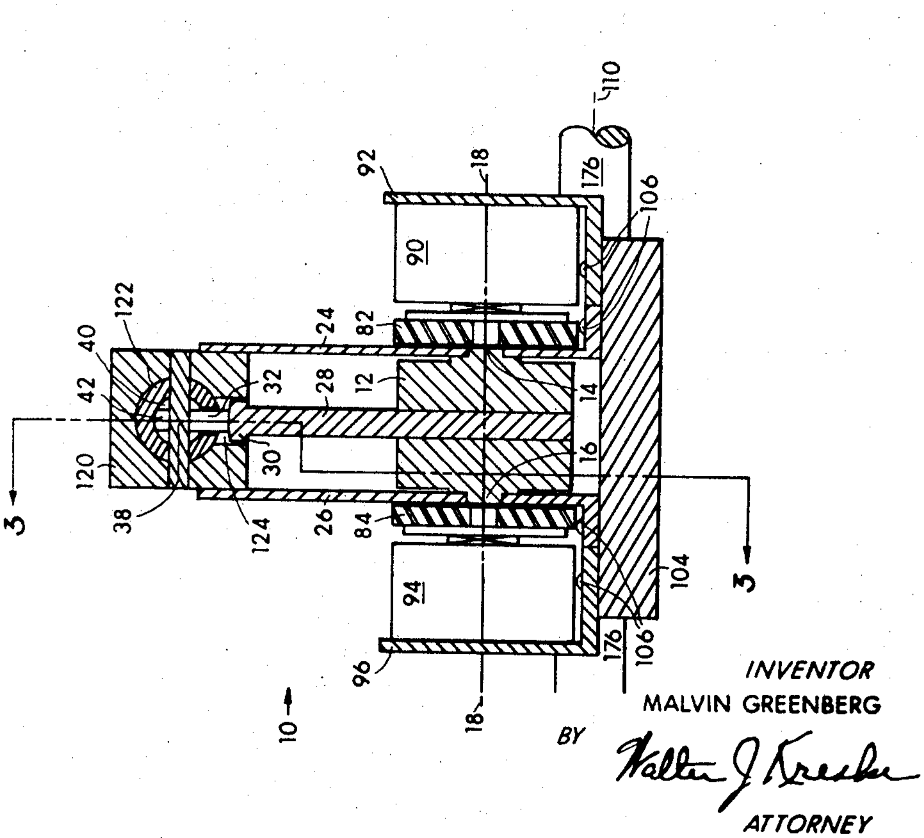
FIG. 2 is a cross sectional view of the assembled mechanism taken on line 2—2 of FIG. 3.

In the operation of the present invention as adapted for use with the FIG. 1 or FIG. 9 illustration of my above mentioned co-pending application, the marking pen 132 will normally be carried in the position shown in FIG. 3 for making a continuous line on the paper record 161 as they move relative to each other as described in the above mentioned application. This position is determined by the normal stable position of the spindle 12 held in place by the yieldable pressure of pressure pins 50 and 52 in vertices 58 and 60 respectively due to the springs 48.

When a student name on the paper record 161 becomes aligned with the marking pen 132 as described in the above mentioned application and the student sends a correct answer signal from his student transmitter 10 or 11 described in the above mentioned application, it will cause the right rotary solenoid 90 to be energized so as to rotate the spindle 12 in a clockwise direction as viewed in FIG. 3 within the limits permitted by the triangular openings 54 and 56 respectively as described above. This rotation will result in a movement of the lever 28 in slot 32 carrying the pin 34 to cause the piston 40 to be moved to the right as shown in FIG. 3. Thereby, the marking pen 132 will mark a jog to the right opposite the name of the student as an indication of a correct answer.

On the other hand, if the student's answer is incorrect, the signal from his transmitter 10 or 11 would energize the left rotary solenoid 94 causing the spindle 12 and thereby the lever 28 in slot 32 with pin 34 to move piston 40 to the left and thereby the marking pen 132 to the left to effect a jog to the left opposite the name of that student to indicate an incorrect answer. No response from the student would be indicated by a straight line opposite the student's name on the paper record 161.

This mechanism lends itself well to inexpensive construction of die-cast plastic members such as the spindle 12, left and right striker plates 82 and 84, bushing block 120, plunger 46, piston 40 and lever 28.

Movement of the marking pen 132 to the right and to the left as above described will be very rapid and in each instance when the solenoid is de-energized the spindle 12 and thereby the marking pen 132 is rapidly forced back automatically by springs 48 to the original position determined by the vertices 58 and 60. By way of example and not limitation, a mechanism constructed in accordance with the above description achieved a change of position within a maximum time of 25 milliseconds. It is repeatable up to 20 times per second. Such rapidity of response makes possible rapid relative movement between chart 161 and marking pen 132, thereby enabling the mechanism to service individual responses of the entire student body in a very short space of time.

As previously mentioned, the bidirectional limited motion mechanism 10 is also applicable to other uses where a limited bidirectional movement with a stable center or neutral, normal use position is needed. For example, electrical switching arrangements often require this type of movement.

This device is not limited to the specific details of construction and operation herein described as equivalents will suggest themselves to those skilled in the art.

What is claimed is:

1. In a bidirectional limited motion producing mechanism, the combination of a spindle having a longitudinal axis, a lever projecting from said spindle substantially perpendicular to said axis and having an end adapter for imparting motion to a use device, means for rotating said spindle about said axis in one direction, means for rotating said spindle about said axis in the opposite direction, a spring pressed plunger extending from said spindle, and a triangular-shaped formation having two sides extending from a vertex and engaging said spring pressed plunger in manner for said plunger to ride said sides and come to rest in said vertex.

2. The combination as in claim 1 wherein said means for rotating said spindle includes rotary solenoid means.

3. The combination as in claim 1 wherein said means for rotating said spindle in the one direction includes a rotary solenoid and said means for rotating the spindle in the opposite direction includes another rotary solenoid.

4. The combination as in claim 1 wherein said rotating means includes a base carrying a pair of center brackets arranged for rotatively mounting said spindle therebetween, each of said center brackets including said triangular shaped formation engaging said spring pressed plunger.

5. The combination as in claim 4 wherein each of said rotary solenoids carries a striker plate having an angular recess, and a projection on each side of said spindle in the angular recess of the associated striker plate for imparting angular motion from said striker plate to said spindle.

6. The combination as in claim 1 wherein said adapter includes a member mounted to slide in a linear path, said member being coupled to said lever for thereby converting the angular motion of the lever to linear motion of said member.

7. The combination as in claim 4 wherein the means for rotating said spindle about said axis in one direction includes a rotating solenoid engaging one side of said spindle and a solenoid bracket fixed to said base and solenoid for carrying said solenoid in operative relation to said spindle, and said means for rotating said spindle about said axis in the opposite direction includes another rotary solenoid engaging the other side of said spindle and a second solenoid bracket fixed to said base and other solenoid for holding said other solenoid in operative relation to said spindle.

References Cited

UNITED STATES PATENTS

| | | | |
|---|---|---|---|
| 2,873,412 | 2/1959 | Pratt | 335—228 |
| 2,763,793 | 9/1956 | Krasney | 335—228 |
| 2,449,901 | 9/1948 | Kaiser | 310—36 |

J. D. MILLER, *Primary Examiner.*